US012062270B2

(12) United States Patent
Khosla et al.

(10) Patent No.: US 12,062,270 B2
(45) Date of Patent: Aug. 13, 2024

(54) VEHICLE MONITORING

(71) Applicant: QUALCOMM Incorporated, San Diego, CA (US)

(72) Inventors: Abha Khosla, San Deigo, CA (US); Soumya Das, San Diego, CA (US); Srujith Reddy Katamreddy, Ingolstadt (DE); Phani Kumar Dasam, Reading (GB); Bala Ramasamy, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/702,221

(22) Filed: Mar. 23, 2022

(65) Prior Publication Data

US 2023/0306832 A1    Sep. 28, 2023

(51) Int. Cl.
*G08B 21/02*    (2006.01)
*H04W 4/46*    (2018.01)

(52) U.S. Cl.
CPC .............. *G08B 21/02* (2013.01); *H04W 4/46* (2018.02)

(58) Field of Classification Search
CPC ........ G08B 21/02; H04W 4/46; H04W 4/029; H04W 4/38; H04W 4/90; H04W 12/80; G01S 5/16; G01S 2205/01; G06V 20/58; G06V 2201/08; G08G 1/017; G08G 1/0175; G08G 1/096716; G08G 1/096741; G08G 1/096758; G08G 1/096775; G08G 1/20; G08G 1/205
See application file for complete search history.

(56) References Cited

U.S. PATENT DOCUMENTS

| | | | |
|---|---|---|---|
| 2007/0139182 A1* | 6/2007 | O'Connor | H04W 4/90 340/539.22 |
| 2010/0142438 A1* | 6/2010 | Chen | H04L 51/58 370/328 |
| 2012/0028599 A1* | 2/2012 | Hatton | G08G 1/096775 455/404.2 |
| 2015/0310740 A1 | 10/2015 | Elzein et al. | |
| 2018/0007521 A1* | 1/2018 | Meredith | H04W 4/46 |
| 2019/0096215 A1* | 3/2019 | Shahid | G08G 1/09626 |

FOREIGN PATENT DOCUMENTS

WO    2021146891 A1    7/2021

OTHER PUBLICATIONS

International Search Report and Written Opinion—PCT/US2023/014082—ISA/EPO—Jun. 16, 2023.

* cited by examiner

*Primary Examiner* — Brian Wilson
(74) *Attorney, Agent, or Firm* — Sunstein LLP

(57) ABSTRACT

A method of vehicle-to-vehicle monitoring includes: receiving, at a monitor vehicle, a trigger to provide a report relating to a target vehicle, the trigger including identifying information of the target vehicle; obtaining, at the monitor vehicle, first information wirelessly that at least partially identifies the target vehicle; determining, at the monitor vehicle, that the first information corresponds to the identifying information of the target vehicle; and reporting, from the monitor vehicle based on receipt of the trigger and determining that the first information corresponds to the identifying information of the target vehicle, second information indicating presence of the target vehicle and a location associated with the target vehicle.

27 Claims, 10 Drawing Sheets

```
                                    ┌─ 1100
DetectedObjectData::= SEQUENCE {
        detObjCommon  DetectedObjectCommonData,
        -- Common data for detected object
        detVeh DetectedVehicleData OPTIONAL,
        -- Detected vehicle data
        detVRU DetectedVRUData OPTIONAL,
        -- Detected VRU data
        detObst DetectedObstacleData OPTIONAL
        -- Detected obstacle data
        detMonVeh DetectedMonitorVehicleData OPTIONAL,
        --Detected Monitored vehicle data
        }
```

FIG. 11

```
                                    ┌─ 1200
DetectedMonitoredVehicleData ::= SEQUENCE {
      lights ExteriorLights OPTIONAL,
      vehOrientation VehicleOrientationAngle OPTIONAL,
      orientationConfidence HeadingConfidence OPTIONAL,
      vehAttitude Attitude OPTIONAL,
      vehAttitudeConfidence AttitudeConfidence OPTIONAL,
      vehAngVel AngularVelocity OPTIONAL,
      vehAngVelConfidence AngularVelocityConfidence OPTIONAL,
      size VehicleSize OPTIONAL,
      height VehicleHeight OPTIONAL,
      vehicleSizeConfidence OPTIONAL,
      vehicleClass BasicVehicleClass OPTIONAL,
      classConf ClassificationConfidence OPTIONAL,
      VehLicensePlate Monitored Vehicle's License plate OPTIONAL,
      VehLicensePlateconfidence Monitored Vehicle's License plate confidence
OPTIONAL,(only present if DetectedObjectData includes detMonVeh)
      VehColor     Monitored Vehicle's color OPTIONAL,
      VehColorConfidence Monitored Vehicle's color Confidence OPTIONAL,
      VehMake     Monitored Vehicles Make OPTIONAL,
      VehMakeConfidence Monitored Vehicle's Make Confidence OPTIONAL,
      VehModel    Monitored Vehicles Model OPTIONAL,
      VehModelConfidence Monitored Vehicle's Model Confidence OPTIONAL,

… # VEHICLE MONITORING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example monitor vehicle includes: a transceiver; a memory; and a processor, communicatively coupled to the memory and the transceiver, configured to: receive, via the transceiver, a trigger to provide a report relating to a target vehicle, the trigger including identifying information of the target vehicle; obtain first information wirelessly that at least partially identifies the target vehicle; determine that the first information corresponds to the identifying information of the target vehicle; and report, via the transceiver based on receipt of the trigger and determining that the first information corresponds to the identifying information of the target vehicle, second information indicating presence of the target vehicle and a location associated with the target vehicle.

An example method of vehicle-to-vehicle monitoring includes: receiving, at a monitor vehicle, a trigger to provide a report relating to a target vehicle, the trigger including identifying information of the target vehicle; obtaining, at the monitor vehicle, first information wirelessly that at least partially identifies the target vehicle; determining, at the monitor vehicle, that the first information corresponds to the identifying information of the target vehicle; and reporting, from the monitor vehicle based on receipt of the trigger and determining that the first information corresponds to the identifying information of the target vehicle, second information indicating presence of the target vehicle and a location associated with the target vehicle.

Another example monitor vehicle includes: means for receiving a trigger to provide a report relating to a target vehicle, the trigger including identifying information of the target vehicle; means for obtaining first information wirelessly that at least partially identifies the target vehicle; means for determining that the first information corresponds to the identifying information of the target vehicle; and means for reporting, based on receipt of the trigger and determining that the first information corresponds to the identifying information of the target vehicle, second information indicating presence of the target vehicle and a location associated with the target vehicle.

An example non-transitory, processor-readable storage medium includes processor-readable instructions to cause a processor of a monitor vehicle to: receive a trigger to provide a report relating to a target vehicle, the trigger including identifying information of the target vehicle; obtain first information wirelessly that at least partially identifies the target vehicle; determine that the first information corresponds to the identifying information of the target vehicle; and report, based on receipt of the trigger and determining that the first information corresponds to the identifying information of the target vehicle, second information indicating presence of the target vehicle and a location associated with the target vehicle.

BRIEF DESCRIPTION OF THE DRAWINGS

FIG. 11 is a structure of a detected object data information element.

FIG. 12 is a structure of a detected monitored vehicle data information element.

DETAILED DESCRIPTION

Figure 1:
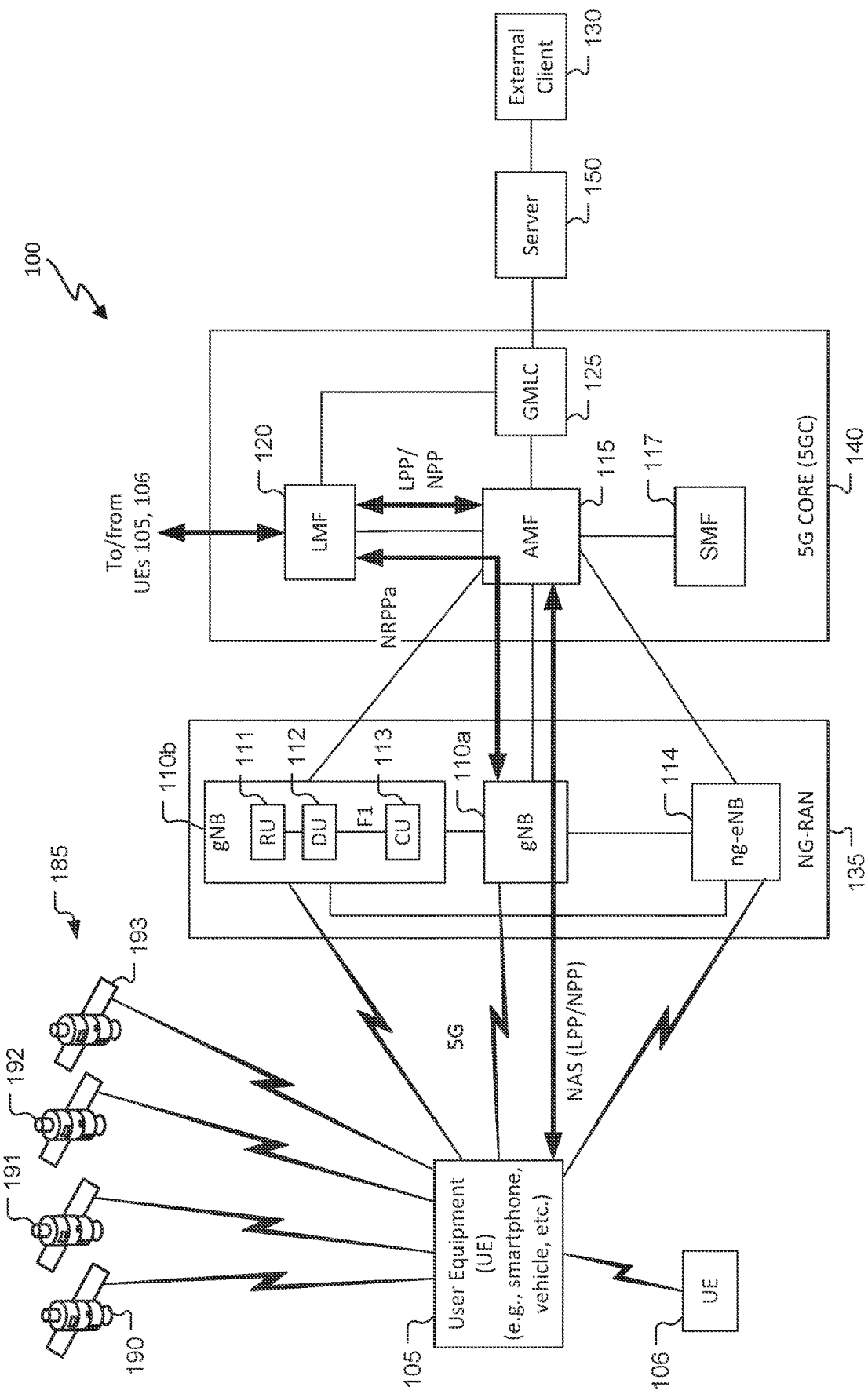
FIG. 1 is a simplified diagram of an example wireless communications system.

Techniques are discussed herein for monitoring one or more vehicles with one or more entities such as one or more other vehicles and/or one or more devices associated with (e.g., disposed in) the monitored vehicle(s). For example, techniques are discussed for alerting one or more network entities, e.g., associated with government authorities and/or private-service providers, to monitor one or more private and/or public vehicles for which monitoring has been requested (e.g., for which a monitoring alert has been issued). For example, an ADAS (Advanced Driver Assistance System) unit of a vehicle may receive camera feeds from various cameras, e.g., front-facing, rear-facing, and side-facing cameras. A monitor vehicle (e.g., the ADAS, and/or a separate processor of the vehicle) may analyze one or more images from the camera(s) to decipher text, e.g., on road signs, and/or to determine one or more other identifying characteristics of another vehicle. The monitor vehicle may be configured to analyze one or more images to decipher text (and possibly images) of license plates. The monitor vehicle may be configured to determine the identifying characteristic(s) and to match/correlate the identifying characteristic(s) with a target vehicle in response to receiving a trigger to do so, e.g., a monitor alert issued by a service provider, a government agency, etc. for the target vehicle. The monitor alert may be unicast to the monitor vehicle, unicast to potential monitor vehicles, broadcast, etc. The monitor vehicle may report the presence of the target vehicle, e.g., to a server in the cloud. One or more monitor vehicles may broadcast messages, e.g., C-V2X SDSMs (Cellular Vehicle-to-Everything Sensor Data Sharing Messages) including one or more characteristics of the target vehicle (e.g., location, license plate number, vehicle make, vehicle model, vehicle color, etc.). A server, e.g., disposed in the cloud, may collect messages from one or more monitor vehicles over time to determine movements of the target vehicle, and may provide information to one or more other entities, e.g., an owner of the target vehicle, law enforcement, etc. Other configurations, however, may be used.

Items and/or techniques described herein may provide one or more of the following capabilities, as well as other capabilities not mentioned. Vehicles may be monitored, e.g., presence and location identified, in the absence of satellite navigation system information. Efficiency and/or speed of locating a target vehicle may be improved, e.g., by having one or more monitor vehicles identify the target vehicle and provide the location(s) of the monitor vehicle(s) to one or more appropriate entities (e.g., emergency responders in the case of an emergency alert prompting the monitoring). Confidence of target vehicle location may be improved, e.g., by using multiple monitor vehicles to provide information about location of the target vehicle, even in the presence of SPS (Satellite Positioning System) spoofing or other hinderances to obtaining target vehicle location. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
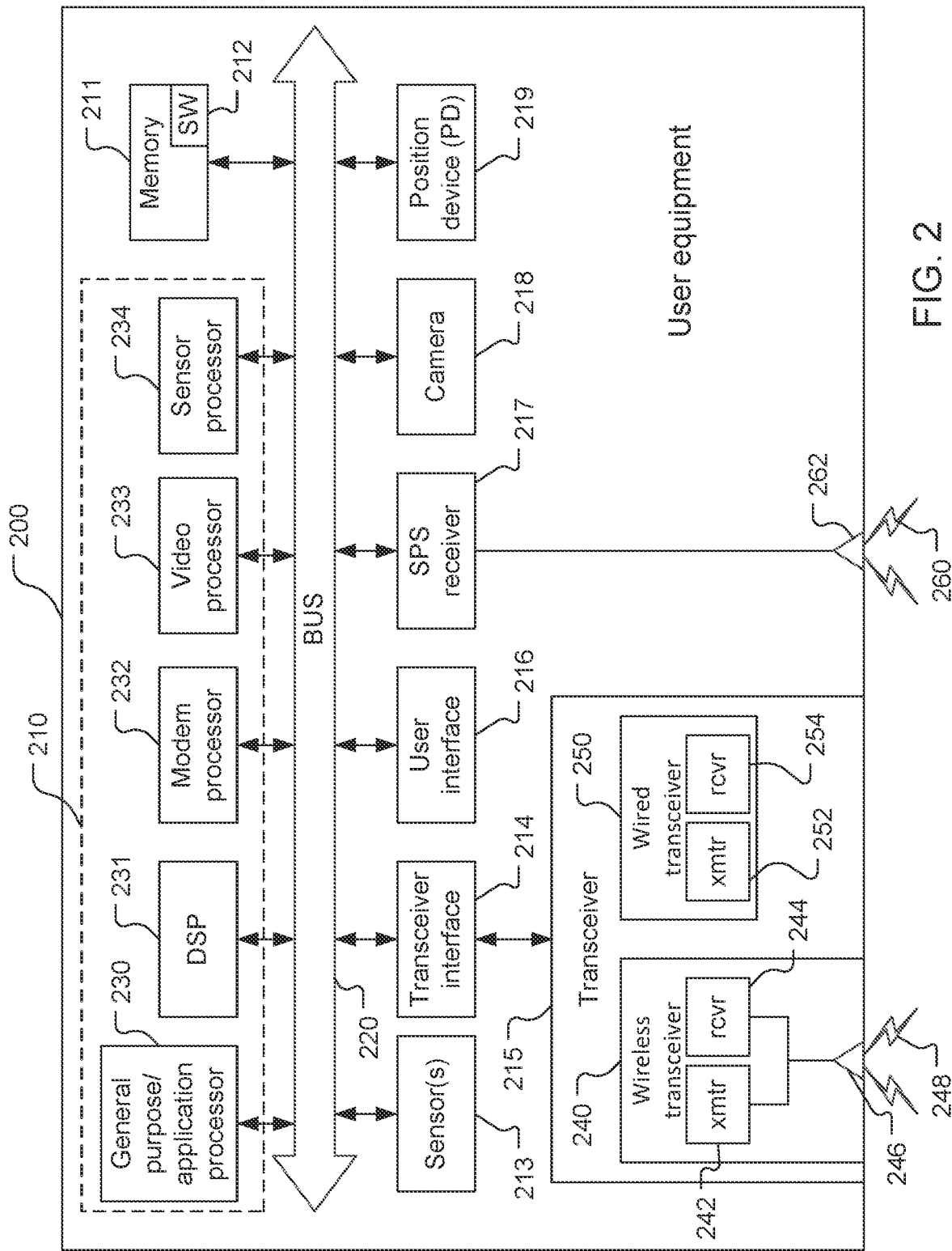
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
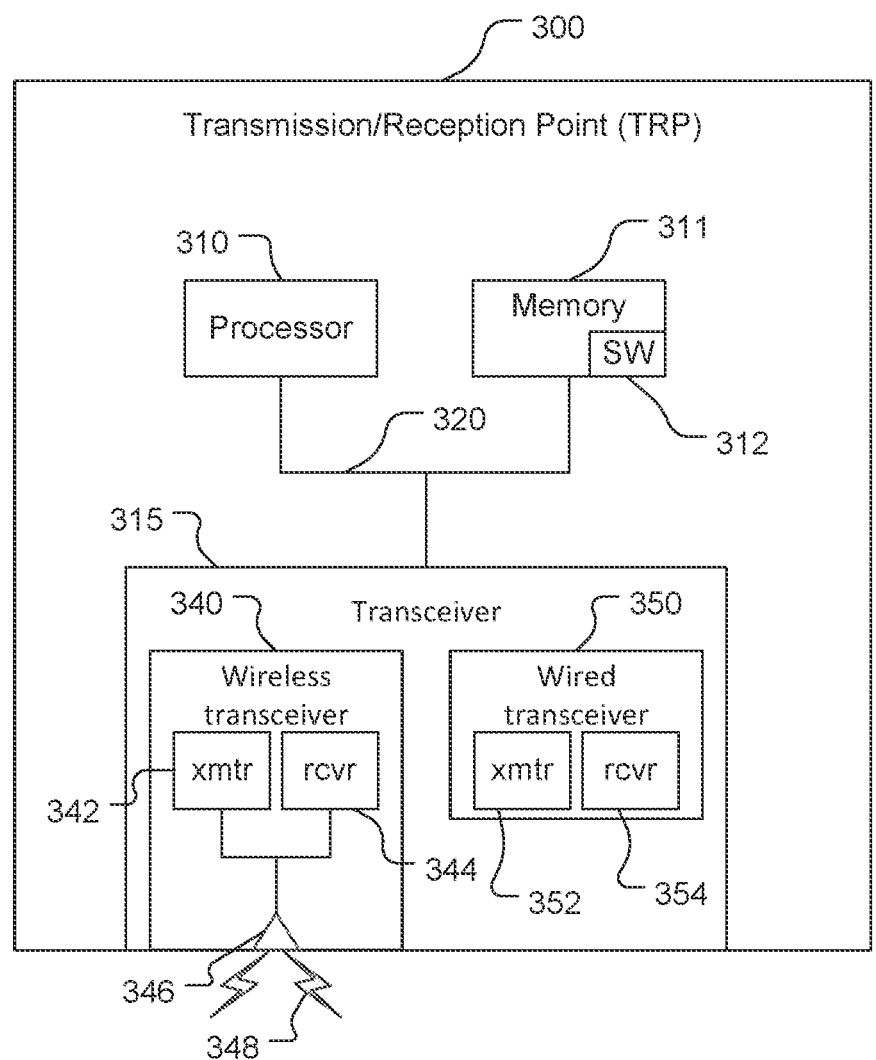
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
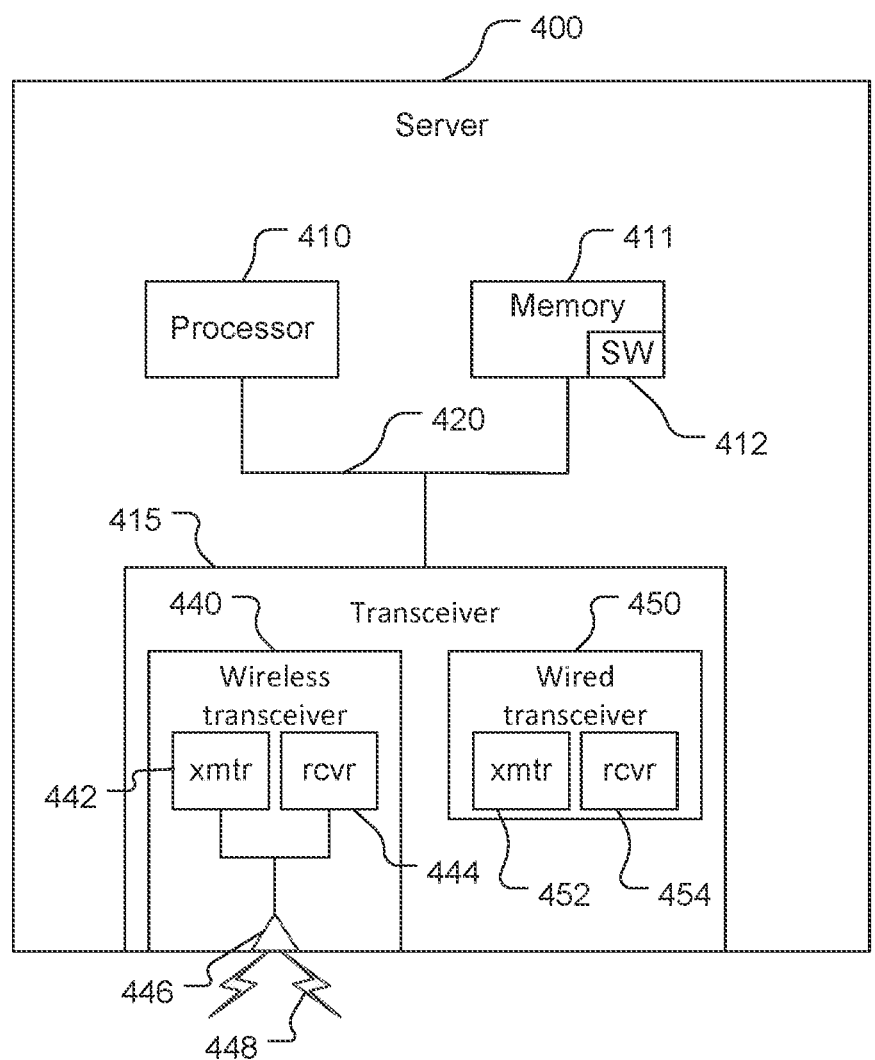
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

C-V2X technology allows vehicles to communicate with other entities (e.g., vehicles, roadside units (RSUs), VRUs (vulnerable road users)) within C-V2X range. In addition to supporting safety applications, C-V2X technology, in particular NR C-V2X technology, may be leveraged for advanced use cases such as sensor sharing, cooperative driving, and/or platooning (where a group of autonomous/semi-autonomous vehicles coordinate among themselves to move in the same lane in a train-like manner, keeping a small (substantially) constant inter-vehicle distance, e.g., in order to reduce fuel consumption and gas emissions and to achieve safe and efficient transport). C-V2X technology can be used to enhance the success rate of monitoring vehicles from private enterprises, as C-V2X technology is envisioned to be ubiquitously present in vehicles soon.

Figure 5:
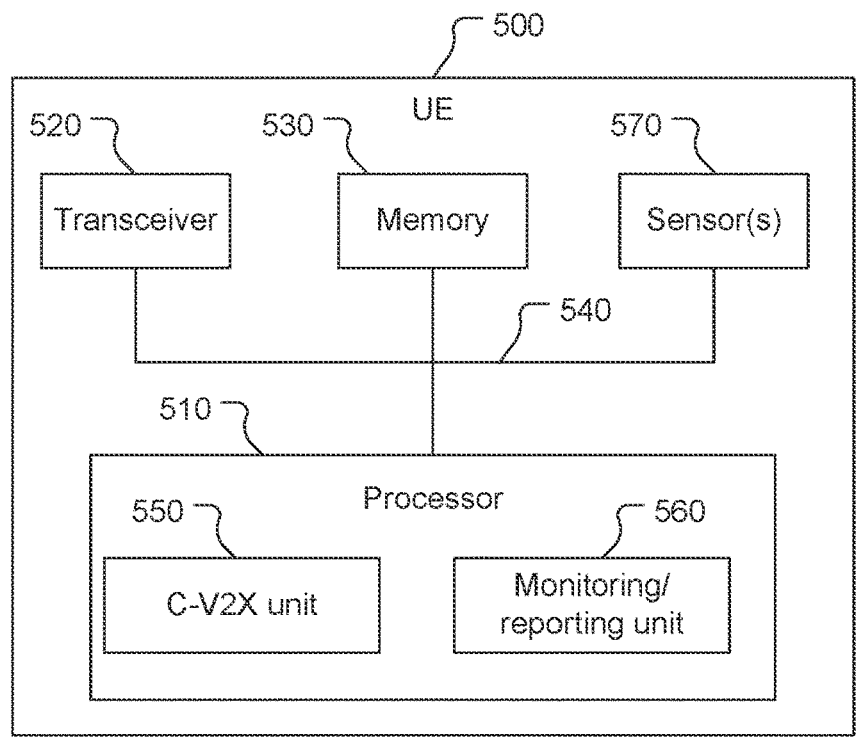
FIG. 5 is a block diagram of an example user equipment.

Referring also to FIG. 5, a UE 500 includes a processor 510, a transceiver 520, and a memory 530 communicatively coupled to each other by a bus 540. The UE 500 may include one or more sensor(s) 570 (e.g., one or more cameras and/or one or more microphones and/or one or more ranging devices, and/or ultrasound sensors, etc.) connected to the bus 540. The UE 500 may include the components shown in FIG. 5. The UE 500 is a wireless communication device and is part of a monitor vehicle (e.g., car, truck, motorcycle, etc.) that is capable of monitoring another vehicle (e.g., analyzing one or more images of a target vehicle to determine and report one or more characteristics of the target vehicle, and/or receiving and reporting one or more messages from another monitor vehicle regarding the target vehicle, etc.). The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a C-V2X unit 550 and/or the processor 510 in combination with the transceiver 520 (possibly in combination with the memory 530 and/or one or more of the sensor(s) 570 (e.g., one or more cameras and/or one or more microphones, etc.)) may include a monitoring/reporting unit 560. The C-V2X unit 550 and the monitoring/reporting unit 560 are discussed further below, and the description may refer to the processor 510 generally, or the UE 500 generally, as performing any of the functions of the C-V2X unit 550 or the monitoring/reporting unit 560, with the UE 500 being configured to perform the functions of the C-V2X unit 550 and/or the monitoring/reporting unit 560. The C-V2X unit 550 and/or the monitoring/reporting unit 560 provide an ADAS unit and a TCU (telematic control unit) of the monitor vehicle. The TCU provides an embedded system on board the monitor vehicle that wirelessly connects the monitor vehicle to other vehicles and/or network entities (e.g., for cloud services) via V2X standards over a cellular network. The TCU may include a GNSS unit (e.g., the SPS receiver 217), an external interface for mobile communications, a processing unit, and memory. The C-V2X unit 550 and the monitoring/reporting unit 560 are shown in the processor 510, which may comprise one or more physical devices. For example, the C-V2X unit 550 may reside in a telematics unit and the monitoring/reporting unit 560 may reside in an ADAS processor that is physically separate from, and interconnected to, the telematics unit by some interface such as USB (Universal Serial Bus), Ethernet, etc.

Figure 6:
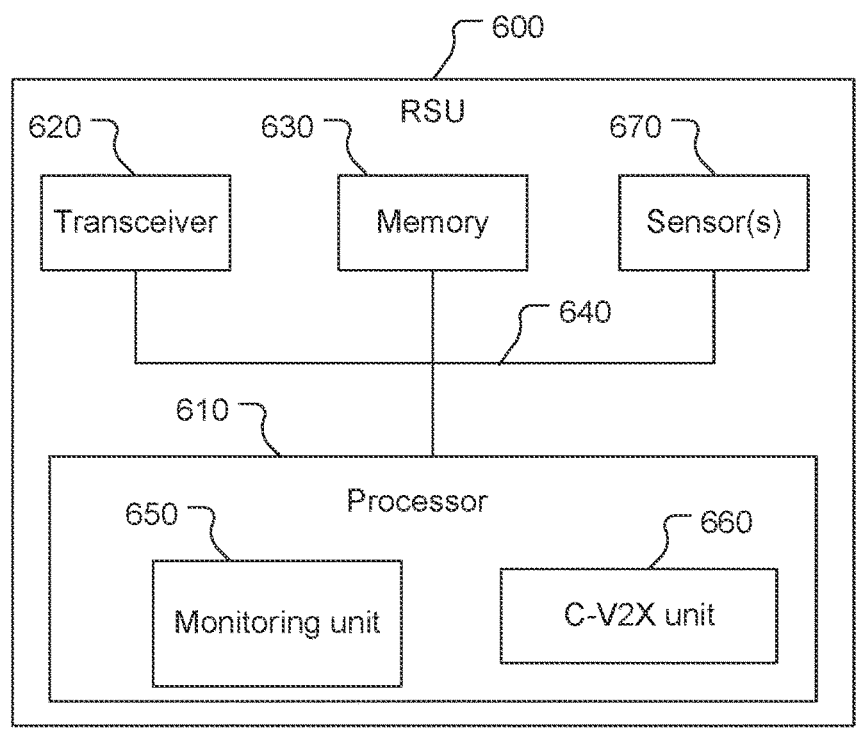
FIG. 6 is a block diagram of an example roadside unit.

Referring also to FIG. 6, an RSU 600 (roadside unit) includes a processor 610, a transceiver 620, and a memory 630 communicatively coupled to each other by a bus 640. The RSU 600 may include the components shown in FIG. 6. The RSU 600 may include one or more sensor(s) 670 (e.g., one or more cameras and/or one or more microphones and/or one or more ranging systems, and/or ultrasound sensors, etc.) connected to the bus 640. The RSU 600 may include one or more other components such as any of those shown in FIG. 3 such that the TRP 300 may be an example of the RSU 600. For example, the processor 610 may include one or more of the components of the processor 310, the transceiver 620 may include one or more of the components of the transceiver 315, and/or the memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the RSU 600 performing a function as shorthand for one or more appropriate components (e.g., the processor 610 and the memory 630) of the RSU 600 performing the function. The processor 610 (possibly in conjunction with the memory 630 and, as appropriate, the transceiver 620) may include a monitoring unit 650 and a C-V2X unit 660. The C-V2X unit 660 is configured to support C-V2X communications with one or more other entities, and may be part of, or work in conjunction with, the monitoring unit 650. The monitoring unit 650 is discussed further below, and the description may refer to the processor 610 generally, or the RSU 600 generally, as performing any of the functions of the monitoring unit 650 and/or the C-V2X unit 660, with the RSU 600 being configured to perform the functions of the monitoring unit 650 and the C-V2X unit 660.

Figure 7:
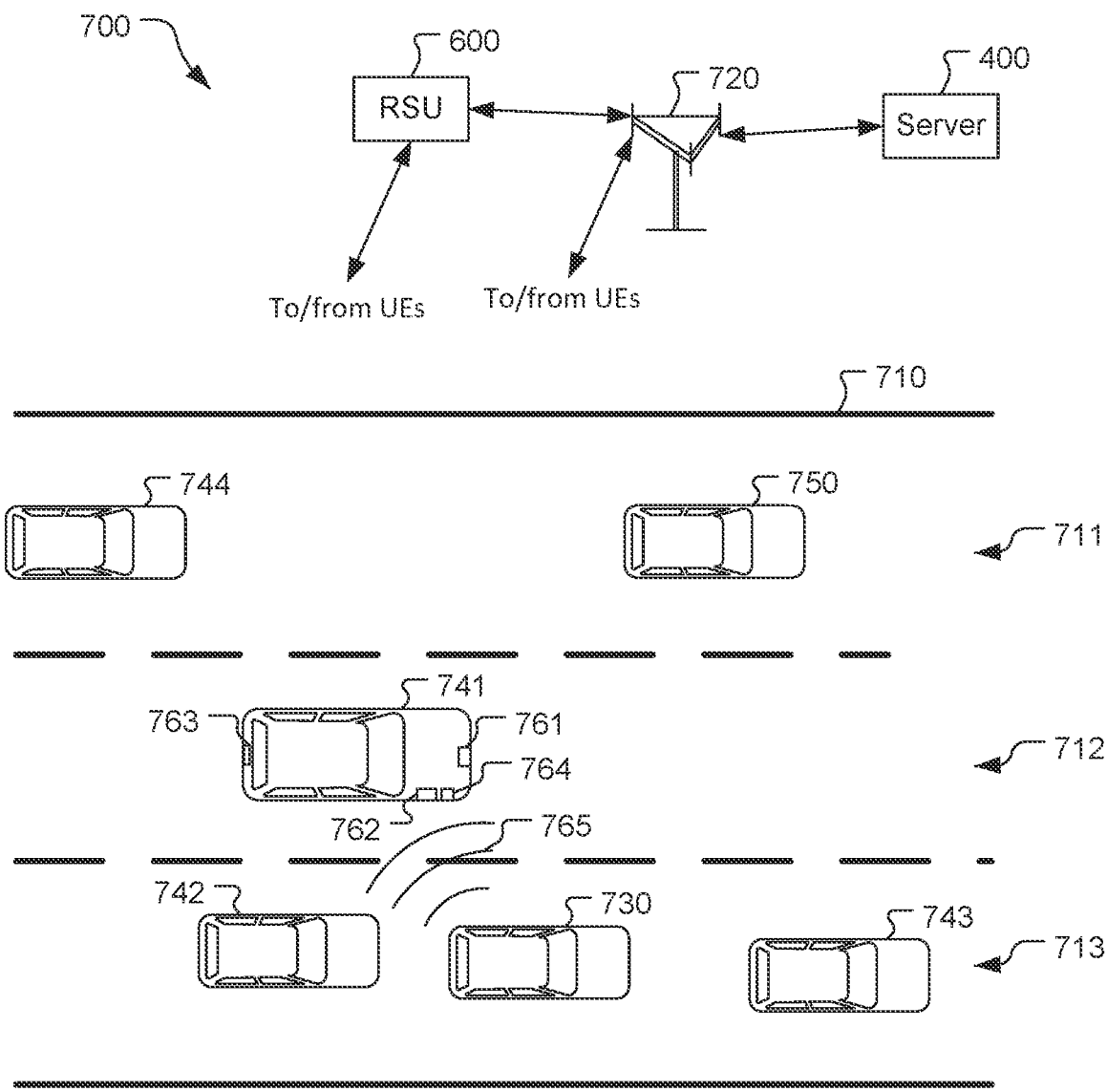
FIG. 7 is an example environment including vehicles including a target vehicle to be monitored.

Referring also to FIG. 7, an environment 700 includes a road 710 including lanes 711, 712, 713 on which multiple vehicles are traveling. The RSU 600 is disposed proximate to the road 710 and is configured for communication with appropriately-equipped vehicles and for communication with the server 400, e.g., via a communication network (e.g., via a base station 720 including the TRP 300). The environment 700 includes a target vehicle 730 that is desired to be monitored (e.g., location identified and reported, location tracked and reported, etc.), monitor vehicles 741, 742, 743, 744, and a non-monitor vehicle 750. The environment 700 is an example, as other environments may include other quantities of RSUs, base stations, servers, monitor vehicles, and/or target vehicles. The target vehicle 730 is desired to be monitored for one or more reasons (e.g., the target vehicle 730 is associated with a missing-person report, the target vehicle is carrying a vulnerable road user (VRU) (e.g., an underage person, a disabled person, an infirm person, etc.), is carrying high-value cargo (e.g., cash for/from a bank, gems, artwork, etc.), is part of a vehicle fleet of a service provider, etc. The target vehicle 730 may be equipped with tracking equipment, e.g., a GNSS system, but separate tracking may be desired (e.g., as a backup to the GNSS system (e.g., when the GNSS system is unable to provide location (e.g., is inoperable, is in a poor-performance area such as a covered area (e.g., a tunnel), is disabled, is jammed, etc.)), or as a supplement to the GNSS system). The target vehicle 730 may or may not be equipped with C-V2X technology (to communicate using C-V2X protocol(s)). The monitor vehicles 741-744 are configured to be capable of monitoring the target vehicle 730 and reporting information regarding the monitoring of the target vehicle 730. The non-monitor vehicle 750 is not configured to monitor the target vehicle 730 (e.g., not configured to sense appropriate information and/or not configured to analyze sensed information to determine one or more characteristics of the target vehicle 730 and/or not configured to report such characteristic(s)). Alternatively, the non-monitor vehicle 750 may be configured to perform these functions but has had one or more of these functions disabled (e.g., due to a user of the non-monitor vehicle 750 opting out of the non-monitor vehicle 750 being a monitor vehicle or not opting in to have the non-monitor vehicle 750 being a monitor vehicle).

The monitor vehicles 741-744 may be used as a second set of eyes on the road. For example, the sensor(s) 570 of the monitor vehicle 741 include one or more sensors to help detect presence of the target vehicle 730. For example, the sensor(s) 570 here include multiple cameras, a front-facing camera 761, a side-facing camera 762, and a rear-facing camera 763 (another side-facing camera may be included but is not shown in FIG. 7), and a microphone 764 (one or more other microphones may be included but are not shown). One or more of the cameras 761-763 and/or the microphone 764 may be omitted from the sensor(s) 570. The sensor(s) 570 may be used to capture information (e.g., one or more images, sound 765, etc.) that may be analyzed to determine the presence of the target vehicle 730.

Figure 8:
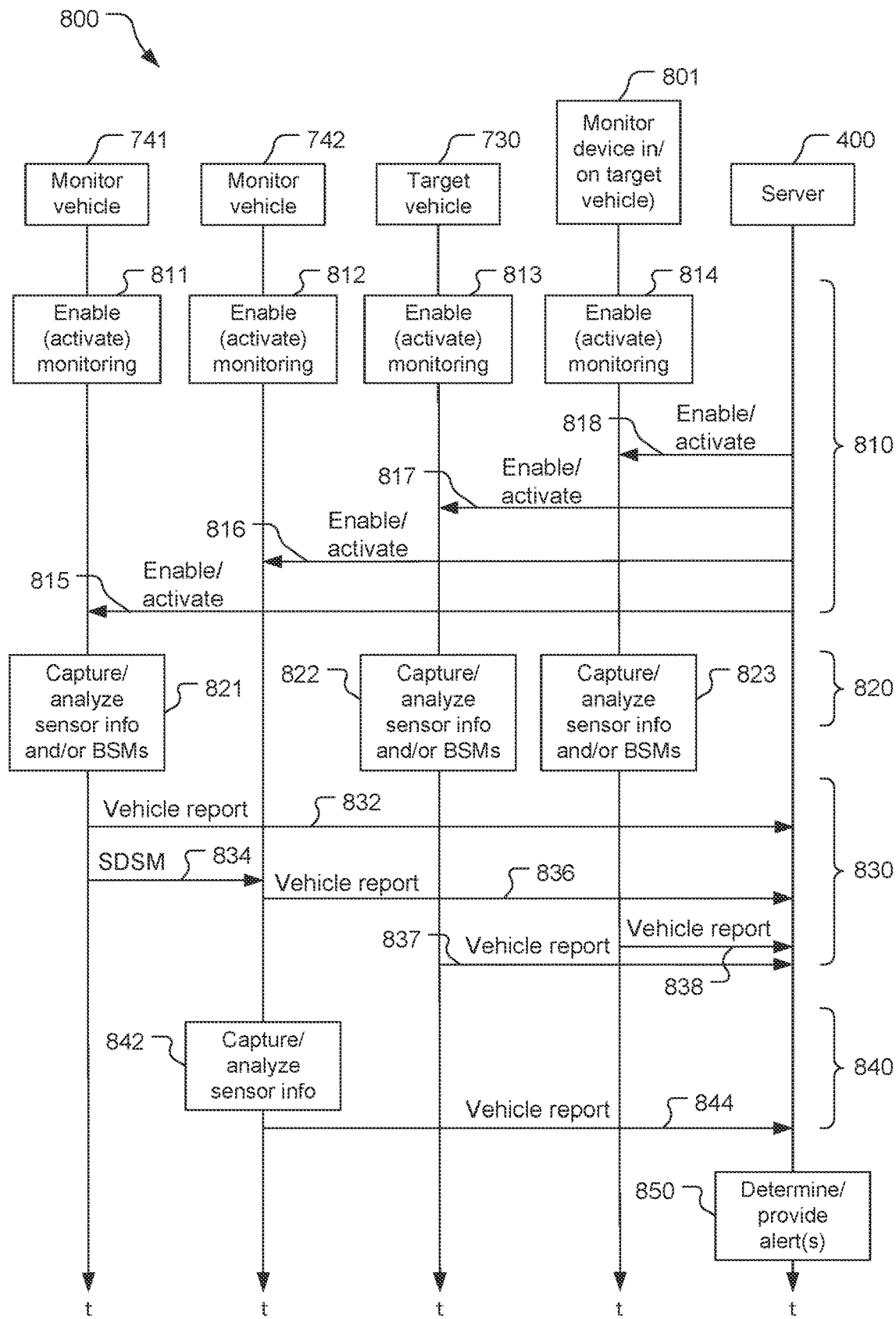
FIG. 8 is a signaling and process flow for monitoring a target vehicle.

Referring to FIG. 8, with further reference to FIGS. 1-7, a timing diagram shows a signaling and process flow 800 for monitoring a target vehicle, with the flow 800 including the stages shown. The flow 800 is for monitoring a target vehicle using one or more monitor vehicles. Other flows are possible, e.g., with one or more stages shown omitted, one or more stages added, and/or one or more stages shown altered.

At stage 810, each of one or more of the monitor vehicles 741, 742, the target vehicle 730, and/or a monitor device 801 disposed in/on the target vehicle 730 is enabled to serve as a monitor (vehicle or device) of, and possibly activated to monitor, the target vehicle 730. For example, at sub-stages 811, 812, an operator of each of the monitor vehicles 741, 742 may select a setting (e.g., using the user interface 216) to enable the monitoring/reporting unit 560 of the respective UE 500. The C-V2X unit 550 may be enabled upon starting of the UE 500 and the monitoring/reporting unit 560, having been enabled, may report messages received from the C-V2X unit 550 (e.g., from the target vehicle 730) to a network (e.g., to the cloud). The enabling of the monitoring/reporting unit 560 may, for example, allow one or more of the sensor(s) 570 to sense relevant information, and/or may allow the ADAS and/or the TCU of the UE 500 to monitor vehicles and report the location and/or other information pertaining to (e.g., characteristics of), or potentially pertaining to, the target vehicle 730 to the cloud, e.g., to the server 400. The activating, if performed, triggers monitoring for the target vehicle 730. As another example, at sub-stage 813, an operator of the target vehicle 730 may select a setting (e.g., using the user interface 216) to enable, and possibly activate (trigger) the C-V2X unit 550 and/or the monitoring/reporting unit 560 of the target vehicle 730. As another example, at sub-stage 814, an operator of a monitor device 801 (which may be an example of the UE 500) that is, or is expected to be soon, disposed on or in the target vehicle 730 may select a setting (e.g., using the user interface 216) to enable, and possibly activate (trigger) the C-V2X unit 550 and/or the monitoring/reporting unit 560 of the monitor device 801. As another example, the server 400 may transmit (e.g., unicast, groupcast, and/or broadcast) one or more monitor-enabling/activation messages 815, 816, 817, 818 to the monitor vehicles 741, 742, the target vehicle 730, and/or the monitor device 801, respectively, instructing one or more of the monitor vehicles 741, 742, the target vehicle 730, and/or the device 801 to enable and activate the C-V2X unit 550 and/or the monitoring/reporting unit 560 (e.g., the ADAS and/or the TCU) of the respective apparatus (vehicle or device). The monitor-enabling/activation messages 815-818 may be sent, for example, via the base station 720, and possibly the RSU 600.

The server 400 may transmit the monitor-enabling/activation messages 815, 816 to the monitor vehicles 741, 742 for one or more of a variety of reasons. For example, the server 400 may be controlled by a government agency and the server 400 may send (e.g., broadcast) a missing-person alert (which may be called an "Amber Alert") to the monitor vehicles 741-744. The monitor vehicles 741-744 may respond by enabling and activating, regardless of any user/operator preferences or settings, the C-V2X unit 550, the monitoring/reporting unit 560 (to trigger monitoring), one of more of the sensor(s) 570, and/or one or more beacons (that transmit (e.g., broadcast) the location of the respective monitor vehicle 741-744). Thus, an enabling/activation message may temporarily (e.g., until monitoring is no longer needed/desired, e.g., is deactivated by the server 400) override a setting that would inhibit reporting of information about the target vehicle 730, e.g., a setting not to enable the C-V2X unit 550 and/or the monitoring/reporting unit 560 (e.g., not to monitor vehicles and/or not to report information about monitored vehicles). As another example, the server 400 may be controlled by a service provider, such as a ridesharing provider (e.g., Uber® or Lyft®), and the server 400 may send one or more monitor-enabling messages in response to a rideshare ride commencing (e.g., as indicated by a message sent from the target vehicle 730 to the server 400 or as indicated by the device 801 or as indicated by a message from a device used to engage the rideshare service with or without being in or on the target vehicle 730 during the ride (e.g., a mobile device of a parent of a child rider of the target vehicle 730, the mobile device of a guardian of a disabled rider, the mobile device of a friend of an impaired (e.g., drunk) rider, etc.)). For example, a person arranging a ride for rider that may be unable, or of reduced capacity, to ensure the safety of the rider may request monitoring of the target vehicle 730 carrying the rider. The rider (e.g., using the device 801) or other person (e.g., that arranges a ride) may take one or more pictures of the target vehicle 730, e.g., of the license plate of the target vehicle 730, and send the picture(s) to the server 400 to request monitoring of the target vehicle 730. As another example, the server 400 may transmit the monitor-enabling message 817 to the target vehicle in response to the target vehicle 730 transmitting one or more vehicle characteristics of the target vehicle 730 to the server 400, e.g., upon initiation of a journey (e.g., a rideshare journey).

Figure 9:
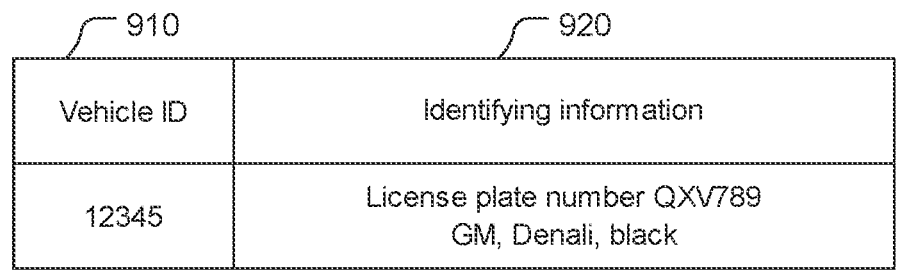
FIG. 9 is an example of a monitor-enabling/activation message.

The monitor-enabling/activation messages 815, 816 include identifying information for the target vehicle 730, and may include a vehicle ID, e.g., a temporary ID assigned to the target vehicle 730, and identifying information including one or more characteristics of the target vehicle 730 to assist in determining that a particular vehicle is the target vehicle. For example, referring also to FIG. 9, an example monitor-enabling/activation message 90 includes a vehicle ID field 910, and an identifying information field 920. The vehicle ID field 910 may be a temporary identity assigned to the target vehicle 730, e.g., randomly assigned and effective until monitoring is no longer desired, or a temporary ID corresponding to a BSM (basic safety message) broadcast by the target vehicle 730 using C-V2X technology, or another ID. The identifying information field 920 may include the license plate number (or partial license plate number) of the target vehicle 730 and/or may include the vehicle make (manufacturer), and possibly the vehicle model and/or color, of the target vehicle 730. Also or alternatively, the identifying information field 920 may include distinguishing markings (e.g., lettering on a side panel (e.g., a door) of the target vehicle 730 (such as a business name, phone number, etc.), damage to the target vehicle, etc.), or a sound associated with the target vehicle 730 (e.g., a sound associated with a particular make and/or model of motorcycle). Still other identifying information may also or alternatively be provided in the identifying information field 920.

The monitor-enabling/activation messages 815-818 may trigger monitoring to be activated or improved. For example, one or more of the messages 815-818 may trigger activation of one or more of the sensor(s) 570, trigger activation of the C-V2X unit 550 (e.g., to listen for transmissions from vehicles, or to broadcast transmissions (e.g., if the recipient of the enable-monitoring/activation message is, or is associated with (e.g., in), the target vehicle 730)), and/or trigger activation of the monitoring/reporting unit 560 to enable monitoring to be performed. Receipt of an enable-monitoring/activation message will trigger analysis for one or more targets, e.g., target vehicles, identified in the enable-monitoring/activation message (e.g., comparing recognized license plate numbers against a license plate number (or partial license plate number) provided in the enable-monitoring/activation message. As another example, one or more of the messages 815-818 may trigger one or more enhanced monitoring capabilities. For example, in response to receipt of an enable-monitoring/activation message, one or more cameras may be activated in addition to one or more cameras already in use, resolution of one or more cameras may be increased, frequency of image capture may be increased, and/or more detailed processing of captured sensor information may be enabled, etc.

At stage 820, the target vehicle 730 is monitored by the monitor vehicles 741, 742 (and/or the monitor vehicles 743, 744) and/or the monitor device 801. For example, the monitoring/reporting unit 560 uses the monitor-enabling/activation message 815 to begin monitoring for the target vehicle 730 (e.g., with the TCU of the monitor vehicle 741 providing information from the message 815 to the ADAS unit and the ADAS unit attempting to correlate this content with obtained information (e.g., sensor-captured information and/or one or more messages received by the transceiver 520, etc.). For example, at sub-stage 821, the monitor vehicle 741 captures (e.g., records) and analyzes sensor information to attempt to identify the target vehicle 730. The monitor vehicle 741, e.g., the monitoring/reporting unit 560 in conjunction with one or more of the sensor(s) 570, may, for example, capture one or more images using one or more cameras, e.g., the front-facing camera 761 and/or the side-facing camera 762, and/or capture one or more sounds 765 using the microphone 764. The monitoring/reporting unit 560 analyzes the image(s) and/or the sound(s) to determine whether any of the image(s) included the target vehicle 730 and/or whether any of the sound(s) correspond to the target vehicle 730. The monitoring/reporting unit 560 may, for example, perform character recognition to identify license plate numbers (that may include letters and/or numbers) and determine whether any of the license plate numbers corresponds to (e.g., matches) some or all of the license plate information for the target vehicle 730. For example, if the monitoring/reporting unit 560 identifies a partial license plate number, then the monitoring/reporting unit 560 may determine that the target vehicle 730 has possibly been located based on the partial license plate number matching a portion of the license plate number of the target vehicle 730. As another example, if only a partial license plate number has been provided for the target vehicle 730, then the monitoring/reporting unit 56) may determine that the target vehicle 730 has possibly been located based on a portion of a captured license plate number matching the partial license plate number provided for the target vehicle 730. As another example, the monitoring/reporting unit 560 may determine whether lettering on a vehicle (e.g., a company name, a logo, etc.) corresponds to lettering indicated in the monitor-enabling/activation message 815. As another example, the monitoring/reporting unit 560 may determine whether a sound captured by the microphone 764 matches (e.g., identically or within a threshold similarity) a sound associated with the target vehicle 730. As another example, the monitoring/reporting unit 560 may determine whether location and content of text or graphics disposed on a vehicle corresponds to such identifying information for the target vehicle 730. As another example, at sub-stage 821, the monitor vehicle 741 may receive and analyze a signal transmitted by the target vehicle 730, e.g., a BSM transmitted by the target vehicle 730 using C-V2X technology. Still other information may be captured and analyzed with respect to identifying information for the target vehicle 730. For example, the monitoring/reporting unit 560 may determine a make and/or model of a vehicle by recognizing text and possibly identifying a location of the text relative to the vehicle. Combinations of information (e.g., partial license plate number, make of vehicle, and color of vehicle) may be analyzed and compared with the identifying information for the target vehicle 730 to attempt to identify the target vehicle 730.

Also or alternatively, other techniques for monitoring the target vehicle 730 may be used. For example, the monitor vehicle 741 may assist an unoccupied aerial vehicle (UAV) to locate the target vehicle 730, e.g., by illuminating the target vehicle 730 with a laser beam, the reflection of which the UAV can acquire. The UAV may then track the target vehicle 730 even without assistance of the laser beam. The UAV may report information regarding the target vehicle 730 to the server 400 (e.g., similar to the discussion of stage 830 below).

Also at sub-stage 821, the monitor vehicle 741 captures sensor information from which a location of the target vehicle 730 can be determined explicitly or implicitly (e.g., a location of the monitor vehicle 741 being implicitly close to the location of the target vehicle 730). For example, the SPS receiver 217 of the sensor(s) 570 may be used to determine the location of the monitor vehicle 741. As another example, one or more images may be captured and analyzed to determine the location of the monitor vehicle 741, e.g., by identifying a landmark and a relative angle to and distance from the landmark. As another example, the location of the monitor vehicle 741 may be determined using trilateration based on RF signals such as WWAN (Wireless Wide Area Network) signals and/or WiFi signals. Still other techniques (e.g., radar) may be used to determine the location of the monitor vehicle 741.

At sub-stages 822, 823, the target vehicle 730 and/or the monitor device 801 may capture sensor information and/or analyze one or more BSMs for determining a location of the target vehicle 730. The target vehicle 730 and/or the monitor device 801 may use one or more position-determining techniques (e.g., a GNSS and/or cellular signals and/or WiFi signals, etc.) to determine a location of the target vehicle 730 or the monitor device 801, respectively, with the location of the monitor device 801 presumed to be the same as the target vehicle 730.

Figure 10:
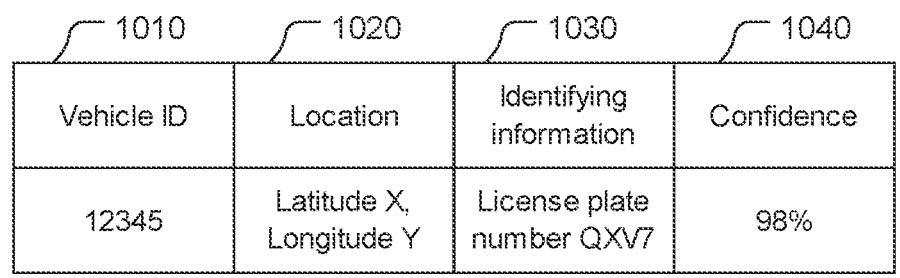
FIG. 10 is an example of a vehicle report.

At stage 830, the monitor vehicle 741 reports one or more indications of the presence of the target vehicle 730 by sending a vehicle report 832 to the server 400. The vehicle report 832 may be sent directly to the server 400, and/or via the RSU 600, and/or via the RSU 600 and the base station 720. The monitoring unit 650 of the RSU 600 may receive and relay content of the vehicle report 832 to the server 400. The vehicle report 832 may include a variety of information indicating possible identification of, and location of, the target vehicle 730. For example, the monitor vehicle 741 may provide the location of the monitor vehicle 741, the location of the target vehicle 730, and/or identifying information (e.g., license plate number, partial license plate number, target vehicle ID (e.g., a temporary ID from a communication (e.g., a BSM) from the target vehicle 730, a vehicle ID assigned to the target vehicle 730 and provided in the monitor-enabling/activation message 815), etc.) to the server 400. The monitor vehicle 741 may provide an indication of a confidence in one or more pieces of reported information and/or a confidence that the target vehicle 730 has been identified. Referring also to FIG. 10, an example target vehicle message 1000 includes a vehicle ID field 1010, a location field 1020, an identifying information field 1030, and a confidence field 1040. The identifying information field 1030 indicates the type(s) of information used (e.g., license plate number, make/model/color of vehicle, vehicle sound, etc.) to attempt to identify the target vehicle 730. The confidence field 1040 may include the confidence of one or more items in the identifying information field 1030 (e.g., in this example, a confidence in the accuracy of the partial license plate number provided) and/or an overall confidence that the target vehicle 730 has been identified.

Also or alternatively at stage 830, the monitor vehicle 741 may transmit (e.g., broadcast) one or more messages, e.g., SDSM (Sensor Data Sharing Message), to other vehicles and/or the RSU 600 (e.g., the monitoring unit 650), e.g., using the C-V2X unit 550 of the monitor vehicle 741 using NR V2X technology. For example, the monitor vehicle 741 may transmit an SDSM 834 that is received by the monitor vehicle 742, e.g., the C-V2X unit 550 of the monitor vehicle 742. The monitor vehicle 742 may relay the SDSM 834, or content of the SDSM 834, in a vehicle report 836 to the server 400 (directly or indirectly, e.g., through the RSU 600 and/or the base station 720). The monitor vehicle 742 may be considered to be a monitor vehicle for transmitting the vehicle report 836 even if the monitor vehicle 742 is relaying monitor information without capturing monitoring information using one or more of the sensor(s) 570 of the monitor vehicle 742. The monitor vehicle 742 may also or alternatively send an SDSM, including content of the SDSM 834, to another monitor vehicle that transmits content of the SDSM 834 to the server 400. Having the monitor vehicle 742 provide the vehicle report 837 may be particularly useful where the monitor vehicle 742 has not been registered to monitor the target vehicle 730 directly (e.g., to monitor BSMs from the target vehicle 730, to capture and analyze sensor information to identify and report the target vehicle 730, etc.). The monitor vehicle 742 can provide monitoring information regarding the target vehicle 730 without relying on receiving messages (e.g., BSMs) from the target vehicle 730 (e.g., where the target vehicle 730 does not transmit C-V2X messages (e.g., not being configured to do so, or being configured to do so but not being enabled to do so, or being disabled from doing so).

Existing SDSM structure may be modified to report information for the target vehicle 730. For example, the existing SDSM information element (IE) structure may be modified to include a new type of detected object corresponding to a vehicle that has been designated for monitoring, e.g., in an emergency alert. For example, referring also to FIG. 11, a detected object data IE 1100 of an SDSM may be configured as shown. The new DetectedMonitorVehicleData IE can be configured to include identifying information for the target vehicle 730. For example, referring also to FIG. 12, a DetectedMonitorVehicleData IE 1200 may have the structure shown. As shown, the VehLicensePlate IE with the license plate number of the target vehicle 730 is optional, e.g., being present only if the DetectedObjectData IE includes the detMonVeh IE. Similarly, the VehLicensePlateconfidence IE is optional, being present only if the DetectedObjectData IE includes the detMonVeh IE. The DetectedMonitorVehicleData IE 1200 includes optional information of vehicle license plate, confidence in the vehicle lice plate determination, vehicle color, confidence in the vehicle color determination, vehicle make, confidence in the vehicle make determination, vehicle model, and confidence in the vehicle model determination. These pieces of information are examples and other information may be included in the DetectedMonitorVehicleData IE.

Also or alternatively at stage 830, the target vehicle 730 and/or the monitor device 801 may transmit a vehicle report 837 and/or a vehicle report 838, respectively. The vehicle reports 837, 838 may include location of the target vehicle 730 and identifying information (e.g., target vehicle ID, license plate number, vehicle make/model/color, etc.).

At stage 840, the monitor vehicle 742 may take one or more actions, in addition to or instead of sending the vehicle report 836, in response to receiving the message 834 from the monitor vehicle 741. For example, if the monitor vehicle 742 is relevant to the target vehicle 730, then the monitor vehicle 742 may provide an alert to a user of the monitor vehicle regarding the target device 730. For example, if the target vehicle 730 is associated with a suspected abduction, and the monitor vehicle 742 is a police car, then the monitor vehicle 742 may provide an audible and/or visual indication to a user of the monitor vehicle 742 alerting the user as to the presence of the target vehicle 730 and possibly the location of the target vehicle 730 and an indication of the relevance of the target vehicle 730 (in this case, being associated with an abduction). As another example, if the target vehicle 730 is associated with a person needing medical assistance and the monitor vehicle 742 is an ambulance, then the user(s) of the monitor vehicle 742 may be alerted to the presence and location of the target vehicle 730 and the assistance needed. As another example, at sub-stage 842, the monitor vehicle 742 may respond to the SDSM 834 as a monitor-enabling/activation message by enabling and/or enhancing monitoring for the target vehicle 730 (e.g., as discussed with respect to the messages 815-818). The monitor vehicle 742 may send a vehicle report 844 to the server 400 as appropriate, e.g., with information (e.g., as discussed above) potentially regarding the target vehicle 730.

At stage 850, the server 400 can determine whether the target vehicle 730 has been found or likely has been found, and provide one or more appropriate alerts. For example, the server 400 may analyze one or more vehicle reports to determine whether the target vehicle 730 has been found (e.g., with more vehicle reports identifying the target vehicle 730 at the same location providing increased confidence). The server 400 may analyze captured sensor data, if provided, to determine whether the target vehicle 730 has been found. Any number of monitor vehicles and/or RSUs may report the detection of the target vehicle 730 to the cloud, which may increase confidence in detecting the presence and location of the target vehicle 730. This may be particularly useful when one or more monitor vehicles have partial views of the target vehicle 730, such that combining multiple vehicle reports may increase confidence that the target vehicle 730 has been accurately identified. The server 400 may transmit one or more alerts to one or more relevant entities, e.g., unicasting or groupcasting alerts to one or more emergency vehicles (e.g., police cars, ambulances, fire engines, etc.).

The flow 800 may be an ongoing procedure. The flow 800 may be repeated and/or one or more stages repeated in order to locate the target vehicle 730 and to track the target vehicle 730 once located. Further, the flow 800 may be used to locate, and possibly track, multiple target vehicles concurrently. The flow 800 may be applied to numerous use-case scenarios.

In an example implementation, the flow 800 may be used to monitor a vehicle carrying one or more persons (e.g., a rideshare vehicle, a taxi or other public for-hire service vehicle such as a livery service vehicle, a private chauffeur-driven vehicle, etc.). While a ridesharing implementation is discussed, the discussion is applicable to other scenarios (e.g., private chauffeur-driven vehicle monitoring, etc.). Ridesharing services such as Uber® and Lyft® may transport vulnerable riders (e.g., children, disabled persons, infirm persons, small persons, etc.), warranting monitoring of the rideshare vehicle (here the target vehicle 730). The flow 800 may be used to have other vehicles (i.e., in addition to or instead of the rideshare vehicle) monitor the rideshare vehicle. The other vehicles may dynamically form and update a cooperative mesh of information, e.g., visual information regarding the rideshare vehicle, e.g., the location of the rideshare vehicle, one or more driving characteristics of the rideshare vehicle (e.g., speed, proximity to other vehicles, movements (e.g., erratic lane changes), etc.).

Monitoring, e.g., rideshare monitoring, may be initiated at stage 810 by one or more of a variety of entities, e.g., a driver of the rideshare vehicle (at sub-stage 813), autonomously as a service provided by a rideshare company (e.g., by one or more of the monitor-enabling/activation messages 815-818), a rider using a mobile device to capture an image of the rideshare vehicle, including license plate, and uploading the image to the server 400, and/or one or more other actions. For example, a requester of the rideshare service (e.g., a rider or a person arranging the ride for the rider (e.g., a guardian, a parent, a friend, etc.)) may request a rideshare using a rideshare application on a mobile device. A mobile device (here the monitor device 801) of a rider may correlate a dynamic location of the mobile device (e.g., determined using a GNSS) with a dynamic location provided by the rideshare application to determine that the mobile device is in the rideshare vehicle. If the rideshare vehicle location and the mobile device location deviate by more than a threshold distance (e.g., 100 m) before termination of the rideshare, then the mobile device may provide an alert, e.g., to the server 400, to the rideshare service, to other vehicles (e.g., through an SDSM), etc. The mobile device of the rider may provide a vehicle report, e.g., the vehicle report 838) indicating the location of the mobile device and identifying the rideshare vehicle (e.g., vehicle ID, vehicle make/model/color, license plate number, etc.). At sub-stage 813 the target vehicle 730 may provide information to the server 400 (e.g., to the cloud) to initiate the monitoring, e.g., with the vehicle report 837 including a vehicle ID (e.g., vehicle make/model/color, temporary ID from a BSM, and/or license plate number).

In furtherance of monitoring initiation, a cloud entity, e.g., the server 400, can transmit one or more monitor-enabling/activation messages. For example, the server 400 can unicast identifying information for the target vehicle 730 to one or more monitor vehicles and/or one or more monitor devices, e.g., in one or more of the monitor-enabling/activation messages 815-818. The monitor vehicle(s) and/or monitor device(s) may have line-of-sight (LOS) with the target vehicle 730 to monitor the target vehicle 730 using one or more cameras, or may be non-line-of-sight (NLOS) with the target vehicle 730 and monitor the target vehicle 730 using other information, e.g., sound waves and/or a message (e.g., a BSM) broadcast by the target vehicle 730 and/or messages (e.g., SDSM) broadcast by one or more other monitor vehicle(s)/monitor device(s) containing information regarding the target vehicle 730. The LOS and NLOS vehicle(s)/device(s) can report information regarding the target vehicle 730 to the cloud (e.g., target vehicle location and target vehicle ID to the server 400).

The rideshare vehicle monitoring may be terminated upon the completion of the rideshare ride. For example, the monitoring may be terminated in response to the location of the monitor device being the same as the destination location requested for the rideshare ride. As another example, the monitoring may be terminated in response to the location of the monitor device 801 and the location of the target vehicle 730 differing by more than a threshold difference and the monitor device 801 indicating that the rideshare ride has been completed (e.g., providing an "all is well" indication). As another example, the monitoring may be terminated in response to a device used to arrange the ride, but that did not use the rideshare ride, indicating that the rideshare ride is complete (e.g., after receiving an "all is well" indication from the rider and/or other trusted source).

In another example implementation, the flow 800 may be used to monitor vehicles with high-value content. For example, a business that provides armored cars for transporting cash to and/or from banks (e.g., to automatic teller machines (ATMs)) may wish to monitor the armored cars. While security personnel may be provided for the armored cars and/or GNSS monitoring of the armored cars used, further monitoring using other vehicles may be desired. This may provide improved monitoring, e.g., in locations where GNSS monitoring fails such as in tunnels or other covered areas, and/or in other GNSS deprived areas (e.g., where signal noise is present, impairing GNSS location services), and/or in situations where GNSS signals are impaired (e.g., a GNSS being disabled or jammed, such as by a thief stealing an armored car).

In another example implementation, the flow 800 may be used to locate and monitor a vehicle associated with an emergency alert, e.g., a missing-person alert (e.g., due to an abduction (which may be called an "Amber Alert"), due to an impaired person (e.g., due to chemical impairment and/or a medical condition)). Monitoring using the flow 800 for a missing-person scenario may provide timely, updated information as to a location of a target vehicle (which may be used to predict future location of the target vehicle). This information may be used to direct services to the target vehicle quickly, e.g., directing police to the target vehicle to thwart an abductor.

Monitoring of a vehicle associated with an emergency alert, e.g., a missing-person alert, may be initiated at stage 810 by one or more of a variety of entities. For example, at sub-stage 811, a user (e.g., an owner) of the monitor vehicle 741 may enable the monitor vehicle 741 to receive emergency alerts, e.g., Wireless Emergency Alerts/Amber Alerts similar to such enablement in mobile devices (e.g., mobile phones). The enabling of receiving emergency alerts may be performed well in advance of any alerts being sent, e.g., with enabling being performed upon purchase of the monitor vehicle 741 by adjusting an appropriate setting. Alternatively, enabling (or opting out of enabling) reporting of information regarding a target vehicle may be performed in response to a request (e.g., an Amber Alert). The monitor vehicle 741 (e.g., the monitoring/reporting unit 560) may receive the broadcasted emergency alert via the transceiver 520, e.g., in the monitor-enabling/activation message 815 that also provides identifying information (e.g., one or more physical characteristics such as license plate number, vehicle make/model/color, etc.) for the target vehicle 730. The monitor vehicle 741 may provide an audible and/or visual notice (e.g., via the user interface 216) regarding the emergency alert. The monitoring/reporting unit 560 of the monitor vehicle 741 captures, at sub-stage 821, information (e.g., sensor information such as camera images, information from one or more other monitor vehicles, etc.) and correlates this information with information from the emergency alert. The monitoring/reporting unit 560 responds to the captured information correlating to the emergency alert (e.g., the monitor vehicle 741 capturing an image of the target vehicle 730) by transmitting the vehicle report 832 (e.g., making an autonomous WWAN call) to the server 400. The autonomous WWAN call may not be an emergency call (e.g., an eCall flag may not be set), for example, being a call to a concierge center instead. The vehicle report 832 is transmitted to authorities to report the presence of the target vehicle 730 along with the location of the target vehicle 730, and possibly other pertinent information such as time of detection. An audible and/or visual indication that the call is being placed to the authorities may be provided to the user of the monitor vehicle 741. The call corresponding to the vehicle report 832 may be a voice call. Also or alternatively, a data call may be made to provide the vehicle report 832 to an emergency control center (e.g., an Amber Alert control center) such as a service running in the cloud with multiple servers. The vehicle report 832 may include one or more captured images of the target vehicle 730 and/or a location, e.g., a high-definition map location. The server 400, at stage 850, may collect vehicle reports from multiple monitor vehicles and/or RSUs, determine presence of the target vehicle 730, and report such presence (and location) to the emergency control center. Combining multiple vehicle reports (at the server 400 and/or at the emergency control center) may increase the confidence that the target vehicle 730 has been accurately identified and increase the confidence as to the location of the target vehicle 730. The monitor vehicle 741 may also or alternatively transmit the SDSM 834 (or other appropriate message) using the C-V2X unit and NR V2X technology. The SDSM 834 may indicate detection of the target vehicle 730, and provide one or more characteristics of the target vehicle 730 to in-range entities such as RSUs 600 and/or other vehicles (e.g., emergency vehicles such as police cars). One or more of the other in-range entities, e.g., the monitor vehicle 742 and/or the RSU 600, may make the WWAN call to report the target vehicle 730 even if the other entity did not capture information of the target vehicle 730 independently of the SDSM 834. The content of the SDSM 834 may be conveyed in a multi-hop manner between multiple entities (e.g., multiple vehicles) in order to reach an entity that can complete the WWAN call and/or otherwise provide content of the SDSM 834 to the cloud.

Monitoring of the target vehicle 730 may be initiated when the target vehicle 730 is in motion or is stationary. For example, the target vehicle 730 may be (though is not required to be) in motion when an emergency alert causes monitoring to begin. As another example, monitoring of the target vehicle 730 for a rideshare may be initiated when the target vehicle 730 is stationary (though not required).

Figure 13:
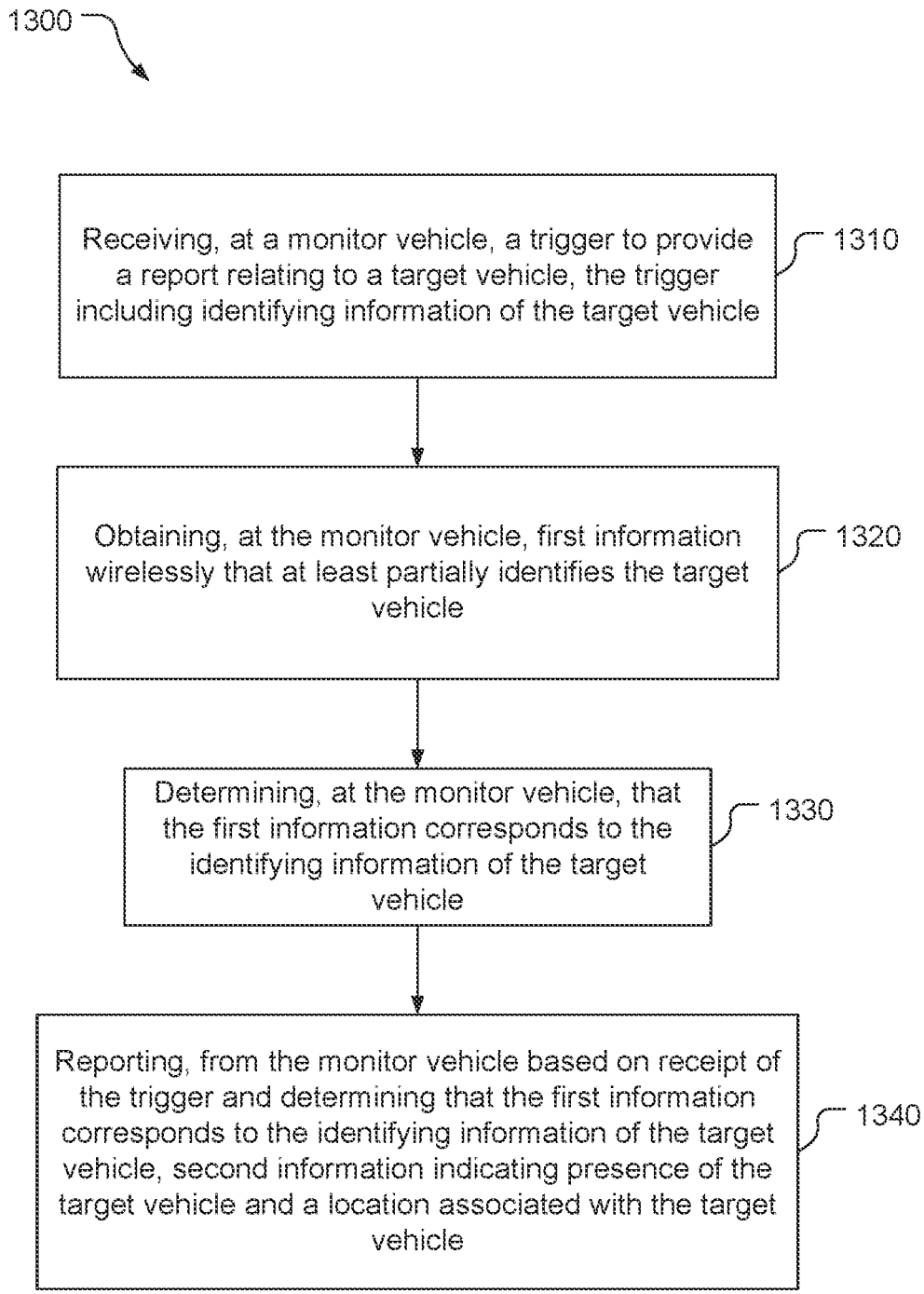
FIG. 13 is a block flow diagram of a method of vehicle-to-vehicle monitoring.

Referring to FIG. 13, with further reference to FIGS. 1-12, a method 1300 of vehicle-to-vehicle monitoring includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes receiving, at a monitor vehicle, a trigger to provide a report relating to a target vehicle, the trigger including identifying information of the target vehicle. For example, at stage 810 the monitor vehicle 741 receives the monitor-enabling/activation message 815, e.g., the monitor-enabling/activation message 900. The message 815 triggers the monitor vehicle 741 to report information regarding the target vehicle 730. The message 815 may trigger the monitor vehicle 741 to capture and analyze information that the monitor vehicle 741 might not otherwise capture to determine if the monitor vehicle 741 captured information (e.g., one or more images) of the target vehicle 730. Alternatively, the message 815 may trigger the monitor vehicle 741 to analyze information that the monitor vehicle 741 would already capture. Also or alternatively, at sub-stage 811, the monitor vehicle 741 may be triggered by input provided by a user through the user interface 216, e.g., a change of a setting to enable the reporting. The processor 510, possibly in combination with the memory 530, possibly in combination with the transceiver (e.g., the wireless receiver 244 and the antenna 246) and/or the user interface 216 may comprise means for receiving the trigger to provide a report relating to a target vehicle.

At stage 1320, the method 1300 includes obtaining, at the monitor vehicle, first information wirelessly that at least partially identifies the target vehicle. For example, at sub-stage 821, the monitor vehicle 741 may capture sensor information about the target vehicle 730, e.g., one or more images of the target vehicle 730, sound emitted by the target vehicle 730, etc. Also or alternatively, the monitor vehicle 741 may receive one or more messages (e.g., BSM(s)) emitted by the target vehicle 730. Also or alternatively, the monitor vehicle 741 may capture sensor information and/or receive one or more messages from vehicles other than the target vehicle 730. As another example, the monitor vehicle 742 may receive the SDSM 834 from the monitor vehicle 741. The processor 510, possibly in combination with the memory 530, possibly in combination with one or more of the sensor(s) 570 and/or the transceiver 520 (e.g., the wireless receiver 244 and the antenna 246) may comprise means for obtaining the first information wirelessly.

At stage 1330, the method 1300 includes determining, at the monitor vehicle, that the first information corresponds to the identifying information of the target vehicle. For example, the monitoring/reporting unit 560 of the monitor vehicle 741 may compare the captured and/or received information (e.g., image(s), message(s), etc.) against the identifying information from the monitor-enabling/activation message 815 or the monitor-enabling/activation trigger received at sub-stage 811, to determine whether any of the captured/received information matches the identifying information. As another example, the monitor vehicle 742 may determine that content of the SDSM 834 corresponds to the identifying information (e.g., by comparing the content to the identifying information and/or by determining that the content of the SDSM 834 indicates that the content corresponds to a target vehicle). The processor 510, possibly in combination with the memory 530, may comprise means for determining that the first information corresponds to the identifying information.

At stage 1340, the method 1300 includes reporting, from the monitor vehicle based on receipt of the trigger and determining that the first information corresponds to the identifying information of the target vehicle, second information indicating presence of the target vehicle and a location associated with the target vehicle. For example, based on being enabled/triggered to provide a report relating to the target vehicle 730 and based on at least some of the captured/received information matching at least some of the identifying information (e.g., a threshold amount of information matching), the monitor vehicle 741 transmits the vehicle report 832 and/or the SDSM 834 indicating presence of the target vehicle 730 and a location of the monitor vehicle 741 (or other device within range of the target vehicle 730 to capture/receive the first information) and/or a location of the target vehicle 730 (e.g., if determined). The processor 510, possibly in combination with the memory 530, in combination with the transceiver 520 (e.g., the wireless transmitter 242 and the antenna 246) may comprise means for reporting the second information.

Implementations of the method 1300 may include one or more of the following features. In an example implementation, obtaining the first information comprises capturing one or more images of the target vehicle, and determining that the first information corresponds to the target vehicle comprises analyzing the one or more images of the target vehicle to determine one or more characteristics of the target vehicle, and comparing the one or more characteristics of the target vehicle to the identifying information of the target vehicle. For example, the monitoring/reporting unit 560 of the monitor vehicle 741 analyzes one or more images to identify one or more characteristics, e.g., one or more characters of a license plate, text indicating a make and model of the target vehicle 730, a color of the target vehicle 730, and/or other identifying information (e.g., lettering and/or an image indicating a business) and compares the captured/analyzed information with the identifying information from stage 810, e.g., to determine whether any of the captured/analyzed information matches any of the identifying information. In a further example implementation, the one or more characteristics of the target vehicle comprise a license plate number, or a maker of the target vehicle, or a model of the target vehicle, or a color of the target vehicle, or any combination thereof.

Also or alternatively, implementations of the method 1300 may include one or more of the following features. In an example implementation, the method 1300 includes overriding, in response receiving the trigger, a setting inhibiting reporting of the second information. For example, in response to a missing-person alert, the processor 510 may override a setting that would prevent reporting of information about the target device 730, e.g., prevent obtaining information about the target device 730 (e.g., monitoring the target device 730 or receiving monitored information about the target device 730) or prevent reporting obtained information about the target device 730. The processor 510, possibly in combination with the memory 530, possibly in combination with the transceiver 520 (e.g., the wireless receiver 244 and the antenna 246) and/or one or more of the sensor(s) 570 may comprise means for overriding a setting inhibiting reporting of the second information. In another example implementation, obtaining the first information comprises recording sound output by the target vehicle. The processor 510, in combination with the memory 530, in combination with one or more of the sensor(s) 570 (e.g., one or more microphones) may comprise means for recording sound output by the target vehicle. In another example implementation, obtaining the first information comprises receiving a radio frequency message from the target vehicle or from another monitor vehicle. For example, the C-V2X unit 550 of the monitor vehicle 741 may receive a message, e.g., a BSM, from the target vehicle 730 (whether the monitor vehicle 741 is LOS or NLOS with respect to the target vehicle 730). The BSM or other message may include a temporary ID for the target vehicle 730. As another example, the C-V2X unit 550 of the monitor vehicle 742 may receive the SDSM 834 from the monitor vehicle 741. The processor 510, possibly in combination with the memory 530, in combination with the transceiver 520 (e.g., the wireless receiver 244 and the antenna 246) may comprise means for receiving a radio frequency message. In another example implementation, receiving the trigger comprises receiving the trigger from a network entity. For example, the monitor vehicle 741 may receive the monitor-enabling/activation message 815 from the server (e.g., via the RSU 600 and/or the base station 720). The processor 510, possibly in combination with the memory 530, in combination with the transceiver 520 (e.g., the wireless receiver 244 and the antenna 246) may comprise means for receiving the trigger from a network entity. In a further example implementation, the trigger comprises a missing-person alert. For example, the monitor-enabling/activation message 815 may be an Amber alert. This may result in an autonomous WWAN call being made in response to the target vehicle 730 being found. In another example implementation, the location associated with the target vehicle is a location estimate of the monitor vehicle. For example, the monitoring/reporting unit 560 may include a location estimate of the monitor vehicle 741 in the vehicle report 832, e.g., as determined by the SPS receiver 217 and/or another position determining technique (e.g., using positioning reference signals from one or more TRPs).

Implementation Examples

Implementation examples are provided in the following numbered clauses.

Clause 1. A monitor vehicle comprising:
a transceiver;
a memory; and
a processor, communicatively coupled to the memory and the transceiver, configured to:
  receive, via the transceiver, a trigger to provide a report relating to a target vehicle, the trigger including identifying information of the target vehicle;
  obtain first information wirelessly that at least partially identifies the target vehicle;
  determine that the first information corresponds to the identifying information of the target vehicle; and
  report, via the transceiver based on receipt of the trigger and determining that the first information corresponds to the identifying information of the target vehicle, second information indicating presence of the target vehicle and a location associated with the target vehicle.

Clause 2. The monitor vehicle of clause 1, further comprising a camera communicatively coupled to the processor, wherein to obtain the first information the processor is configured to receive one or more images of the target vehicle captured by the camera, and to determine that the first information corresponds to the target vehicle the processor is configured to:
  analyze the one or more images of the target vehicle to determine one or more characteristics of the target vehicle; and
  compare the one or more characteristics of the target vehicle to the identifying information of the target vehicle.

Clause 3. The monitor vehicle of clause 2, wherein the one or more characteristics of the target vehicle comprise a license plate number, or a maker of the target vehicle, or a model of the target vehicle, or a color of the target vehicle, or any combination thereof.

Clause 4. The monitor vehicle of clause 1, wherein the processor is configured to override, in response to receiving the trigger, a setting inhibiting reporting of the second information.

Clause 5. The monitor vehicle of clause 1, further comprising a microphone, wherein to obtain the first information the processor is configured to receive an indication of sound output by the target vehicle and received by the microphone.

Clause 6. The monitor vehicle of clause 1, wherein to obtain the first information the processor is configured to receive, via the transceiver, a radio frequency message from the target vehicle or from another monitor vehicle.

Clause 7. The monitor vehicle of clause 1, wherein to receive the trigger the processor is configured to receive, via the transceiver, the trigger from a network entity.

Clause 8. The monitor vehicle of clause 7, wherein the trigger comprises a missing-person alert.

Clause 9. The monitor vehicle of clause 1, wherein the location associated with the target vehicle is a location estimate of the monitor vehicle.

Clause 10. A method of vehicle-to-vehicle monitoring comprising:
receiving, at a monitor vehicle, a trigger to provide a report relating to a target vehicle, the trigger including identifying information of the target vehicle;
obtaining, at the monitor vehicle, first information wirelessly that at least partially identifies the target vehicle;
determining, at the monitor vehicle, that the first information corresponds to the identifying information of the target vehicle; and
reporting, from the monitor vehicle based on receipt of the trigger and determining that the first information corresponds to the identifying information of the target vehicle, second information indicating presence of the target vehicle and a location associated with the target vehicle.

Clause 11. The method of vehicle-to-vehicle monitoring of clause 10, wherein obtaining the first information comprises capturing one or more images of the target vehicle, and determining that the first information corresponds to the target vehicle comprises analyzing the one or more images of the target vehicle to determine one or more characteristics of the target vehicle, and comparing the one or more characteristics of the target vehicle to the identifying information of the target vehicle.

Clause 12. The method of vehicle-to-vehicle monitoring of clause 11, wherein the one or more characteristics of the target vehicle comprise a license plate number, or a maker of the target vehicle, or a model of the target vehicle, or a color of the target vehicle, or any combination thereof.

Clause 13. The method of vehicle-to-vehicle monitoring of clause 10, further comprising overriding, in response receiving the trigger, a setting inhibiting reporting of the second information.

Clause 14. The method of vehicle-to-vehicle monitoring of clause 10, wherein obtaining the first information comprises recording sound output by the target vehicle.

Clause 15. The method of vehicle-to-vehicle monitoring of clause 10, wherein obtaining the first information comprises receiving a radio frequency message from the target vehicle or from another monitor vehicle.

Clause 16. The method of vehicle-to-vehicle monitoring of clause 10, wherein receiving the trigger comprises receiving the trigger from a network entity.

Clause 17. The method of vehicle-to-vehicle monitoring of clause 16, wherein the trigger comprises a missing-person alert.

Clause 18. The method of vehicle-to-vehicle monitoring of clause 10, wherein the location associated with the target vehicle is a location estimate of the monitor vehicle.

Clause 19. A monitor vehicle comprising:
means for receiving a trigger to provide a report relating to a target vehicle, the trigger including identifying information of the target vehicle;
means for obtaining first information wirelessly that at least partially identifies the target vehicle;
means for determining that the first information corresponds to the identifying information of the target vehicle; and
means for reporting, based on receipt of the trigger and determining that the first information corresponds to the identifying information of the target vehicle, second information indicating presence of the target vehicle and a location associated with the target vehicle.

Clause 20. The monitor vehicle of clause 19, wherein the means for obtaining the first information comprise means for capturing one or more images of the target vehicle, and the means for determining that the first information corresponds to the target vehicle comprise means for analyzing the one or more images of the target vehicle to determine one or more characteristics of the target vehicle, and means for comparing the one or more characteristics of the target vehicle to the identifying information of the target vehicle.

Clause 21. The monitor vehicle of clause 20, wherein the one or more characteristics of the target vehicle comprise a license plate number, or a maker of the target vehicle, or a model of the target vehicle, or a color of the target vehicle, or any combination thereof.

Clause 22. The monitor vehicle of clause 19, further comprising means for overriding, in response receiving the trigger, a setting inhibiting reporting of the second information.

Clause 23. The monitor vehicle of clause 19, wherein the means for obtaining the first information comprise means for receiving a radio frequency message from the target vehicle or from another monitor vehicle.

Clause 24. The monitor vehicle of clause 19, wherein the means for receiving the trigger comprise means for receiving the trigger from a network entity.

Clause 25. The monitor vehicle of clause 24, wherein the trigger comprises a missing-person alert.

Clause 26. The monitor vehicle of clause 19, wherein the location associated with the target vehicle is a location estimate of the monitor vehicle.

Clause 27. A non-transitory, processor-readable storage medium comprising processor-readable instructions to cause a processor of a monitor vehicle to:
receive a trigger to provide a report relating to a target vehicle, the trigger including identifying information of the target vehicle;
obtain first information wirelessly that at least partially identifies the target vehicle;
determine that the first information corresponds to the identifying information of the target vehicle; and
report, based on receipt of the trigger and determining that the first information corresponds to the target vehicle, second information indicating presence of the target vehicle and a location associated with the target vehicle.

Clause 28. The non-transitory, processor-readable storage medium of clause 27, wherein the processor-readable instructions to cause the processor of the monitor vehicle to obtain the first information comprise processor-readable instructions to cause the processor of the monitor vehicle to capturing one or more images of the target vehicle, and the processor-readable instructions to cause the processor of the monitor vehicle to determine that the first information corresponds to the target vehicle comprise processor-readable instructions to cause the processor of the monitor vehicle to analyze the one or more images of the target vehicle to determine one or more characteristics of the target vehicle, and processor-readable instructions to cause the processor of the monitor vehicle to compare the one or more characteristics of the target vehicle to the identifying information of the target vehicle.

Clause 29. The non-transitory, processor-readable storage medium of clause 28, wherein the one or more characteristics of the target vehicle comprise a license plate number, or a maker of the target vehicle, or a model of the target vehicle, or a color of the target vehicle, or any combination thereof.

Clause 30. The non-transitory, processor-readable storage medium of clause 27, further comprising processor-readable instructions to cause the processor to override, in response to receiving the trigger, a setting inhibiting reporting of the second information.

Clause 31. The non-transitory, processor-readable storage medium of clause 27, wherein the processor-readable instructions to cause the processor of the monitor vehicle to obtain the first information comprise processor-readable instructions to cause the processor of the monitor vehicle to receive a radio frequency message from the target vehicle or from another monitor vehicle.

Clause 32. The non-transitory, processor-readable storage medium of clause 27, wherein the processor-readable instructions to cause the processor of the monitor vehicle to receive the trigger comprise processor-readable instructions to cause the processor of the monitor vehicle to receive the trigger from a network entity.

Clause 33. The non-transitory, processor-readable storage medium of clause 32, wherein the trigger comprises a missing-person alert.

Clause 34. The non-transitory, processor-readable storage medium of clause 27, wherein the location associated with the target vehicle is a location estimate of the monitor vehicle.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A monitor vehicle comprising:
    a transceiver;
    a memory; and
    a processor, communicatively coupled to the memory and the transceiver, configured to:
        receive, via the transceiver, a trigger to provide a report relating to a target vehicle, the trigger including identifying information of the target vehicle;
        obtain first information wirelessly that at least partially identifies the target vehicle;
        determine that the first information corresponds to the identifying information of the target vehicle;
        report, via the transceiver, based on receipt of the trigger and determining that the first information corresponds to the identifying information of the target vehicle, and second information indicating presence of the target vehicle and a location associated with the target vehicle; and
        override, in response to receiving the trigger, a setting inhibiting reporting of the second information.

2. The monitor vehicle of claim 1, further comprising a camera communicatively coupled to the processor, wherein to obtain the first information the processor is configured to receive one or more images of the target vehicle captured by the camera, and to determine that the first information corresponds to the identifying information of the target vehicle the processor is configured to:
    analyze the one or more images of the target vehicle to determine one or more characteristics of the target vehicle; and
    compare the one or more characteristics of the target vehicle to the identifying information of the target vehicle.

3. The monitor vehicle of claim 2, wherein the one or more characteristics of the target vehicle comprise a license plate number, or a maker of the target vehicle, or a model of the target vehicle, or a color of the target vehicle, or any combination thereof.

4. The monitor vehicle of claim 1, further comprising a microphone, wherein to obtain the first information the processor is configured to receive an indication of sound output by the target vehicle and received by the microphone.

5. The monitor vehicle of claim 1, wherein to obtain the first information the processor is configured to receive, via the transceiver, a radio frequency message from the target vehicle or from another monitor vehicle.

6. The monitor vehicle of claim 1, wherein to receive the trigger the processor is configured to receive, via the transceiver, the trigger from a network entity.

7. The monitor vehicle of claim 6, wherein the trigger comprises a missing-person alert.

8. The monitor vehicle of claim 1, wherein the processor is further configured to report a confidence in at least a portion of the identifying information of the target vehicle having been identified by the monitor vehicle.

9. A method of vehicle-to-vehicle monitoring comprising:
    receiving, at a monitor vehicle, a trigger to provide a report relating to a target vehicle, the trigger including identifying information of the target vehicle;
    obtaining, at the monitor vehicle, first information wirelessly that at least partially identifies the target vehicle;

determining, at the monitor vehicle, that the first information corresponds to the identifying information of the target vehicle; and reporting, from the monitor vehicle based on receipt of the trigger and determining that the first information corresponds to the identifying information of the target vehicle, second information indicating presence of the target vehicle and a location associated with the target vehicle, the reporting including overriding, in response to receiving the trigger, a setting inhibiting reporting of the second information.

10. The method of vehicle-to-vehicle monitoring of claim 9, wherein obtaining the first information comprises capturing one or more images of the target vehicle, and determining that the first information corresponds to the identifying information of the target vehicle comprises analyzing the one or more images of the target vehicle to determine one or more characteristics of the target vehicle, and comparing the one or more characteristics of the target vehicle to the identifying information of the target vehicle.

11. The method of vehicle-to-vehicle monitoring of claim 10, wherein the one or more characteristics of the target vehicle comprise a license plate number, or a maker of the target vehicle, or a model of the target vehicle, or a color of the target vehicle, or any combination thereof.

12. The method of vehicle-to-vehicle monitoring of claim 9, wherein obtaining the first information comprises recording sound output by the target vehicle.

13. The method of vehicle-to-vehicle monitoring of claim 9, wherein obtaining the first information comprises receiving a radio frequency message from the target vehicle or from another monitor vehicle.

14. The method of vehicle-to-vehicle monitoring of claim 9, wherein receiving the trigger comprises receiving the trigger from a network entity.

15. The method of vehicle-to-vehicle monitoring of claim 14, wherein the trigger comprises a missing-person alert.

16. A monitor vehicle comprising:
means for receiving a trigger to provide a report relating to a target vehicle, the trigger including identifying information of the target vehicle;
means for obtaining first information wirelessly that at least partially identifies the target vehicle;
means for determining that the first information corresponds to the identifying information of the target vehicle;
means for reporting, based on receipt of the trigger and determining that the first information corresponds to the identifying information of the target vehicle, and second information indicating presence of the target vehicle and a location associated with the target vehicle; and
means for overriding, in response to receiving the trigger, a setting inhibiting reporting of the second information.

17. The monitor vehicle of claim 16, wherein the means for obtaining the first information comprise means for capturing one or more images of the target vehicle, and the means for determining that the first information corresponds to the identifying information of the target vehicle comprise means for analyzing the one or more images of the target vehicle to determine one or more characteristics of the target vehicle, and means for comparing the one or more characteristics of the target vehicle to the identifying information of the target vehicle.

18. The monitor vehicle of claim 17, wherein the one or more characteristics of the target vehicle comprise a license plate number, or a maker of the target vehicle, or a model of the target vehicle, or a color of the target vehicle, or any combination thereof.

19. The monitor vehicle of claim 16, wherein the means for obtaining the first information comprise means for receiving a radio frequency message from the target vehicle or from another monitor vehicle.

20. The monitor vehicle of claim 16, wherein the means for receiving the trigger comprise means for receiving the trigger from a network entity.

21. The monitor vehicle of claim 20, wherein the trigger comprises a missing-person alert.

22. A non-transitory, processor-readable storage medium comprising processor-readable instructions to cause a processor of a monitor vehicle to:
receive a trigger to provide a report relating to a target vehicle, the trigger including identifying information of the target vehicle;
obtain first information wirelessly that at least partially identifies the target vehicle;
determine that the first information corresponds to the identifying information of the target vehicle;
report, based on receipt of the trigger and determining that the first information corresponds to the identifying information of the target vehicle, second information indicating presence of the target vehicle and a location associated with the target vehicle; and
override, in response to receiving the trigger, a setting inhibiting reporting of the second information.

23. The non-transitory, processor-readable storage medium of claim 22, wherein the processor-readable instructions to cause the processor of the monitor vehicle to obtain the first information comprise processor-readable instructions to cause the processor of the monitor vehicle to capture one or more images of the target vehicle, and the processor-readable instructions to cause the processor of the monitor vehicle to determine that the first information corresponds to the identifying information of the target vehicle comprise processor-readable instructions to cause the processor of the monitor vehicle to analyze the one or more images of the target vehicle to determine one or more characteristics of the target vehicle, and processor-readable instructions to cause the processor of the monitor vehicle to compare the one or more characteristics of the target vehicle to the identifying information of the target vehicle.

24. The non-transitory, processor-readable storage medium of claim 23, wherein the one or more characteristics of the target vehicle comprise a license plate number, or a maker of the target vehicle, or a model of the target vehicle, or a color of the target vehicle, or any combination thereof.

25. The non-transitory, processor-readable storage medium of claim 22, wherein the processor-readable instructions to cause the processor of the monitor vehicle to obtain the first information comprise processor-readable instructions to cause the processor of the monitor vehicle to receive a radio frequency message from the target vehicle or from another monitor vehicle.

26. The non-transitory, processor-readable storage medium of claim 22, wherein the processor-readable instructions to cause the processor of the monitor vehicle to receive the trigger comprise processor-readable instructions to cause the processor of the monitor vehicle to receive the trigger from a network entity.

27. The non-transitory, processor-readable storage medium of claim 26, wherein the trigger comprises a missing-person alert.

* * * * *